(12) United States Patent
Marica

(10) Patent No.: US 8,523,721 B2
(45) Date of Patent: Sep. 3, 2013

(54) BELT TENSIONER

(75) Inventor: Adrian Marica, Cypress, TX (US)

(73) Assignee: National Oilwell Varco, L.P., Houston, TX (US)

( * ) Notice: Subject to any disclaimer, the term of this patent is extended or adjusted under 35 U.S.C. 154(b) by 334 days.

(21) Appl. No.: 13/080,924

(22) Filed: Apr. 6, 2011

(65) Prior Publication Data

US 2012/0258828 A1 Oct. 11, 2012

(51) Int. Cl.
*F16H 7/14* (2006.01)

(52) U.S. Cl.
USPC ........................................................ 474/114

(58) Field of Classification Search
None
See application file for complete search history.

(56) References Cited

U.S. PATENT DOCUMENTS

| | | | |
|---|---|---|---|
| 2,527,977 A | 10/1950 | Voigt | |
| 3,883,009 A | 5/1975 | Swoboda, Jr. et al. | |
| 3,975,965 A | 8/1976 | Speer | |
| 4,042,123 A | 8/1977 | Sheldon et al. | |
| 4,044,895 A | 8/1977 | Adair | |
| 4,069,879 A | 1/1978 | Brown et al. | |
| 4,151,756 A | 5/1979 | Binder et al. | |
| 4,274,778 A | 6/1981 | Putnam et al. | |
| 4,300,890 A | 11/1981 | Hallmann et al. | |
| 4,345,864 A * | 8/1982 | Smith et al. | 414/22.63 |
| 4,348,920 A | 9/1982 | Boyadjieff | |
| 4,457,741 A | 7/1984 | Hoeptner, III | |
| 4,500,303 A | 2/1985 | Sermersheim et al. | |
| 4,610,315 A | 9/1986 | Koga et al. | |
| 4,621,974 A | 11/1986 | Krueger | |
| 4,696,207 A | 9/1987 | Boyadjieff | |
| 4,725,179 A | 2/1988 | Woolslayer et al. | |
| 4,765,401 A | 8/1988 | Boyadjieff | |
| 4,834,694 A | 5/1989 | Martin | |
| 4,904,232 A | 2/1990 | Kitahama et al. | |
| 4,932,926 A | 6/1990 | Lauderbach et al. | |
| 5,152,721 A | 10/1992 | Sajczvk et al. | |
| 5,176,581 A | 1/1993 | Kumm | |
| 5,234,385 A | 8/1993 | Kawashima et al. | |
| 5,277,666 A | 1/1994 | Kumm | |
| 5,352,160 A | 10/1994 | Sakai et al. | |
| 5,540,627 A | 7/1996 | Miyata | |
| 5,720,683 A | 2/1998 | Patton | |
| 5,850,881 A | 12/1998 | Rodger et al. | |
| 5,921,876 A * | 7/1999 | Zelinski | 474/114 |
| 5,951,423 A * | 9/1999 | Simpson | 474/109 |
| 6,458,055 B1 | 10/2002 | Bellamy-Booth | |
| 6,543,551 B1 | 4/2003 | Sparks et al. | |

(Continued)

OTHER PUBLICATIONS

Pipe Racking System PRS-8/8i, Varco Systems, 2 pp., 2002.

(Continued)

*Primary Examiner* — William E Dondero
*Assistant Examiner* — Mark K Buse
(74) *Attorney, Agent, or Firm* — Williams, Morgan & Amerson, P.C.

(57) ABSTRACT

A tensioner system for tensioning a power transfer member such as a chain or a belt is disclosed. In one example, the system includes a base adapted to rotate about a main shaft that is operatively coupled to a motor, a housing positioned around the main shaft and a plurality of deformable elastic members positioned within the housing. The system further includes a plurality of deforming members positioned within the housing around the main shaft, wherein the plurality of deforming members are adapted to be urged in a radially outward direction so as to deform the deformable elastic members.

19 Claims, 11 Drawing Sheets

(56) References Cited

U.S. PATENT DOCUMENTS

| | | |
|---|---|---|
| 6,592,482 B2 | 7/2003 | Serkh |
| 6,607,459 B1 | 8/2003 | Serkh et al. |
| 6,821,071 B2 | 11/2004 | Woolslayer et al. |
| 7,083,007 B2 | 8/2006 | Herst |
| 7,186,196 B2 | 3/2007 | Quintus |
| 7,207,913 B2 | 4/2007 | Gebrian |
| 7,246,983 B2 | 7/2007 | Zahn et al. |
| 7,448,973 B2 * | 11/2008 | Simmons ............ 474/114 |
| 7,540,465 B1 * | 6/2009 | Miller et al. ............ 248/619 |
| 2003/0158007 A1 | 8/2003 | Redmond |
| 2004/0087401 A1 | 5/2004 | Serkh |
| 2004/0254037 A1 * | 12/2004 | Williamson et al. ........ 474/114 |

OTHER PUBLICATIONS

BJ Hughes Power Pipe Handling, 8 pp., 1980.
Varco Compact Racker, Varco Systems, 2 pp., 2003.
Automated Pipe Racking Systems, Varco Systems, 6 pp., 2001.
ROSTA Anti-vibration Mountings, 12 pp.
The Blue Ones from ROSTA, ROSTA Inc., 6 pp.
ROSTA Motorbases, 15 pp.
ROSTA Technology, ROSTA Rubber Suspension System, 7 pp.

* cited by examiner

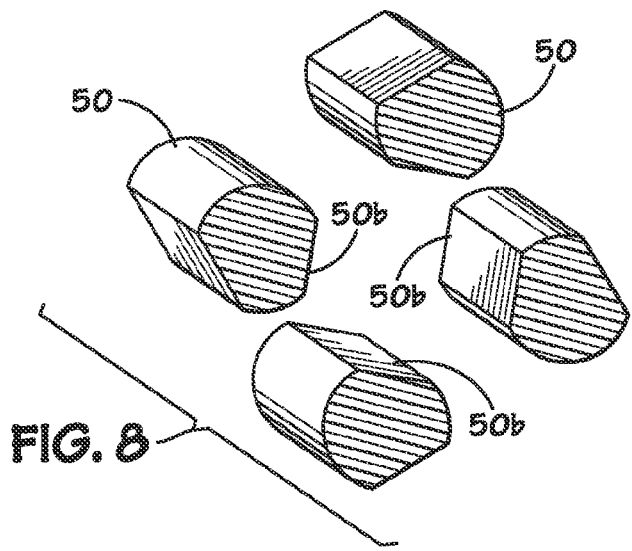
FIG. 8
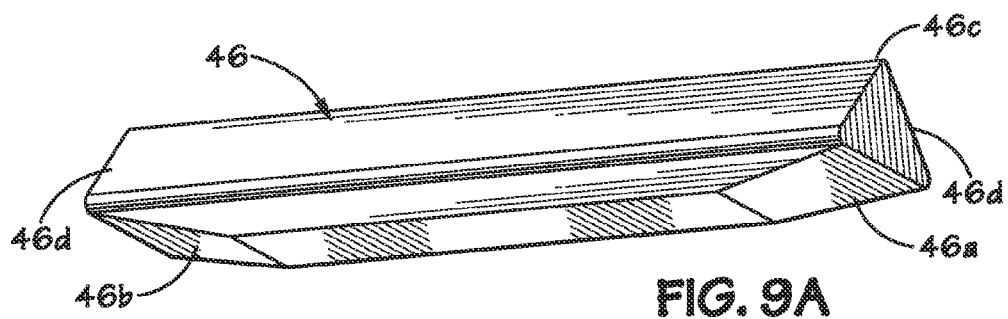
FIG. 9A
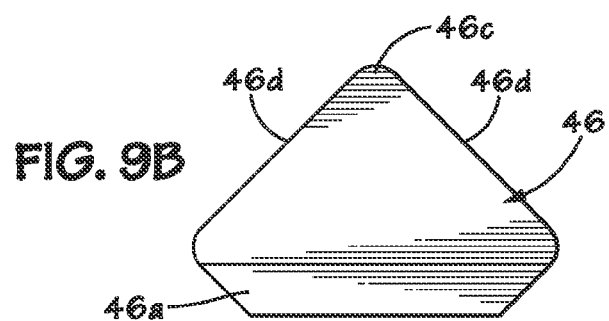
FIG. 9B
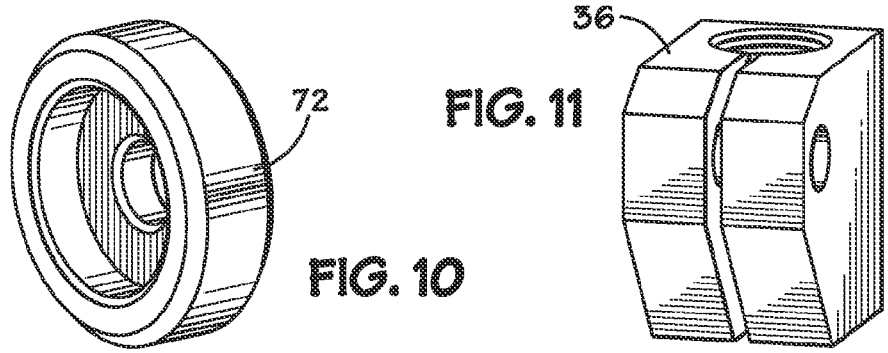
FIG. 10
FIG. 11

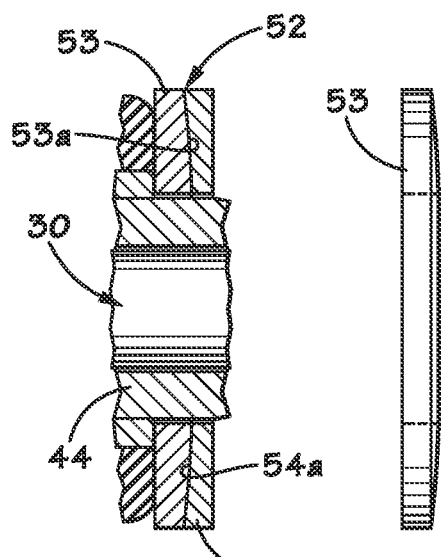
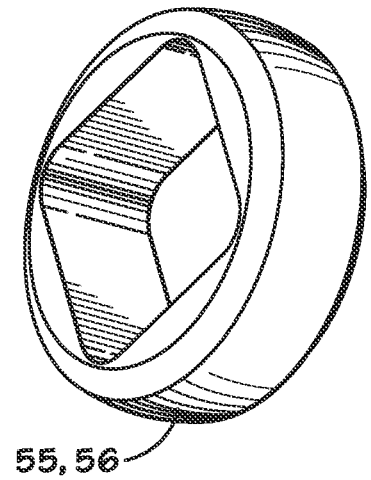
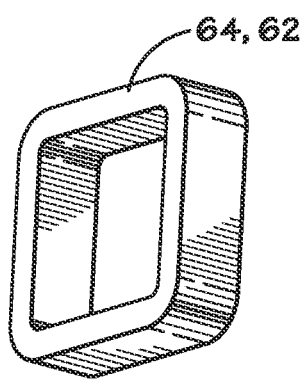
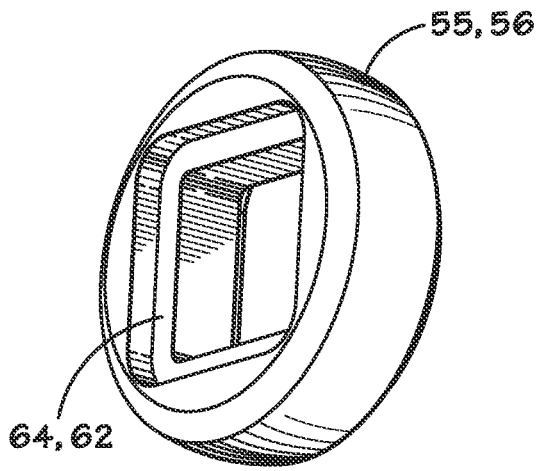

BELT TENSIONER

BACKGROUND

1. Field of the Disclosure

The present invention is generally directed to tensioners for a power transferring member, such as a belt or chain, used with a motor.

2. Description of the Related Art

There is a wide variety of known pipe racking systems for manipulating tubulars used in wellbore operations. Many of these systems employ a handler on a trolley or carriage that moves to facilitate the handing of pipe. Various known motors and related apparatuses are used to move these trolleys and carriages. Other parts of these systems are also moved by a motor or motors. In many cases, the motor transfers power with a belt or chain that extends between a drive member on the motor, e.g., a pulley or gear, and a corresponding driven member on the trolley or carriage. Typically, the correct tension in the chain or belt is applied prior to beginning operation of such a system, such as an illustrative pipe racking system. However, it is common during operation for such belts and chains to become loose, requiring re-tensioning if effective and efficient operation of the overall system is to continue.

Various prior art tensioning systems provide means for adjusting the tension of the power transfer member, e.g., a belt or chain, when the system is stopped or not operating under load conditions. However, such prior art tensioning systems require that operations be stopped to tighten a belt or chain that becomes loose during use. Such stoppage results in downtime and inefficient operations. Additionally, such prior art tensioning systems tended to be less stable and, therefore, subject to loosening during operation due to, for example, vibration.

The present disclosure is directed to various methods and devices that may avoid, or at least reduce, the effects of one or more of the problems identified above.

SUMMARY OF THE DISCLOSURE

The following presents a simplified summary of the present disclosure in order to provide a basic understanding of some aspects disclosed herein. This summary is not an exhaustive overview of the disclosure, nor is it intended to identify key or critical elements of the subject matter disclosed here. Its sole purpose is to present some concepts in a simplified form as a prelude to the more detailed description that is discussed later.

In one aspect, the present disclosure is generally directed to a belt tensioner for a power transfer member, such as a belt or chain, that is driven by a motor. In one illustrative embodiment, the tensioner system includes a base adapted to rotate about a main shaft that is operatively coupled to a motor, a housing positioned around the main shaft and a plurality of deformable elastic members positioned within the housing. The system further includes a plurality of deforming members positioned within the housing around the main shaft, wherein the plurality of deforming members are adapted to be urged in a radially outward direction so as to deform the deformable elastic members.

BRIEF DESCRIPTION OF THE DRAWINGS

The disclosure may be understood by reference to the following description taken in conjunction with the accompanying drawings, in which like reference numerals identify like elements, and in which:

FIG. 8 is a perspective view of illustrative embodiments of the expandable elements for the illustrative tensioner system of FIG. 2A;

FIG. 9A is a perspective view of one illustrative embodiment of an expandable element for the illustrative tensioner system of FIG. 2A;

FIG. 9B is an end view of the illustrative expandable element of FIG. 9A;

FIG. 10 is a perspective view of one illustrative embodiment of a support bushing for the illustrative tensioner system of FIG. 2A;

FIG. 11 is a perspective view of one illustrative embodiment of a split nut for the illustrative tensioner system of FIG. 2A;

FIG. 12 is a cross-section view of one illustrative embodiment of a spherical washer pair for the illustrative tensioner system of FIG. 2A;

FIG. 13 is a cross-sectional side view of one of the illustrative spherical washers shown in FIG. 12;

FIG. 14 is a side view of one of the illustrative spherical washers shown in FIG. 12;

FIG. 15A is a perspective view of one illustrative embodiment of a compression member for the illustrative tensioner system of FIG. 2A;

FIG. 15B is a perspective view of the illustrative compression member of FIG. 15A;

FIG. 16 is a perspective view of one illustrative embodiment of a support bushing for the illustrative tensioner system of FIG. 2A;

Figure 1A:
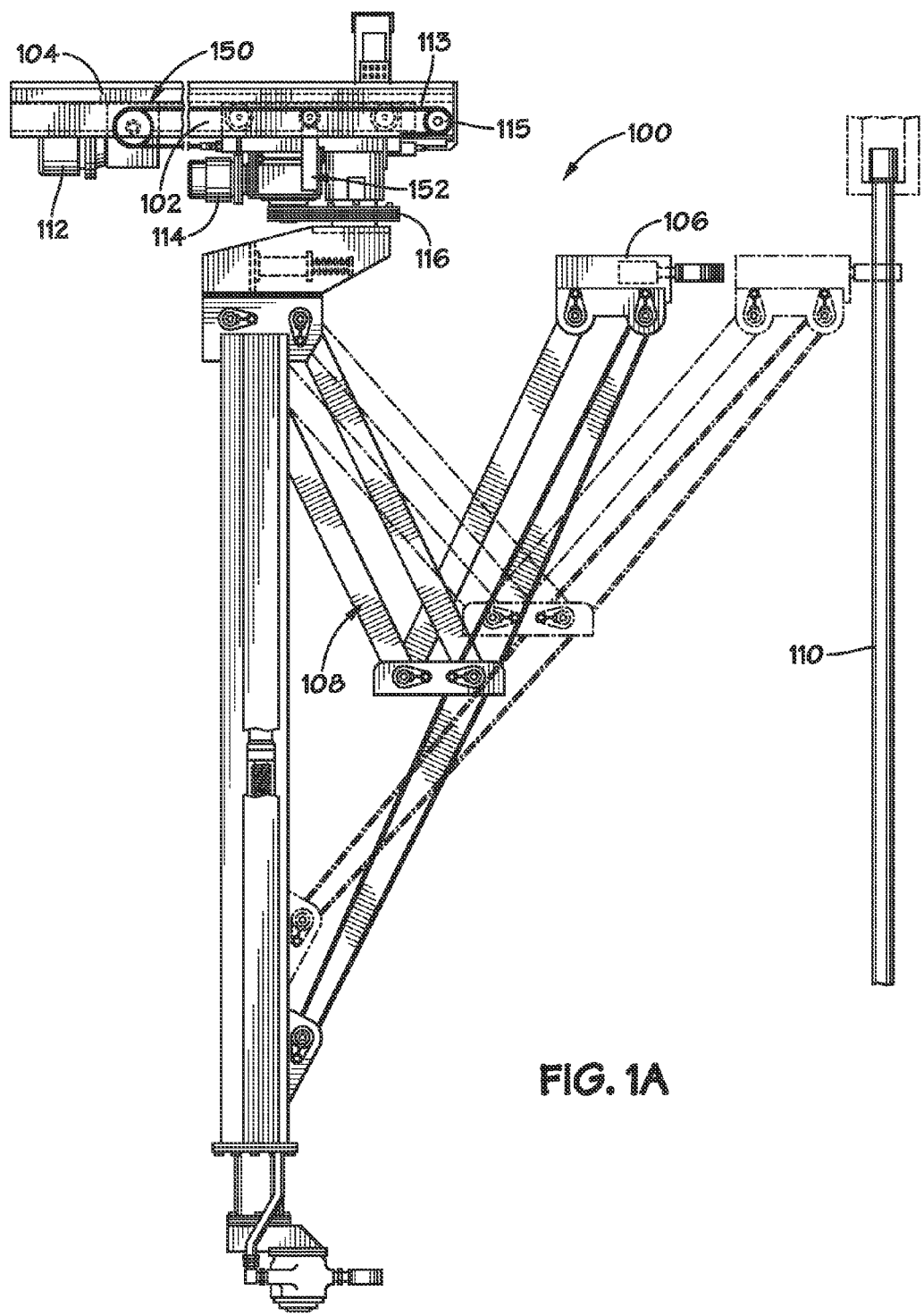
FIG. 1A is a side view of an illustrative pipe racking system with one illustrative embodiment of a tensioner disclosed herein.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As will be recognized by those skilled in the art after a complete reading of the present application, the tensioner system described herein may be employed in a variety of industries and applications with a variety of different devices or machines. For purposes of disclosing the present invention, the drawings and detailed description will refer to the illustrative example wherein the tensioner disclosed herein is employed in an illustrative pipe racker system commonly used in the oil industry.

Figure 1B:
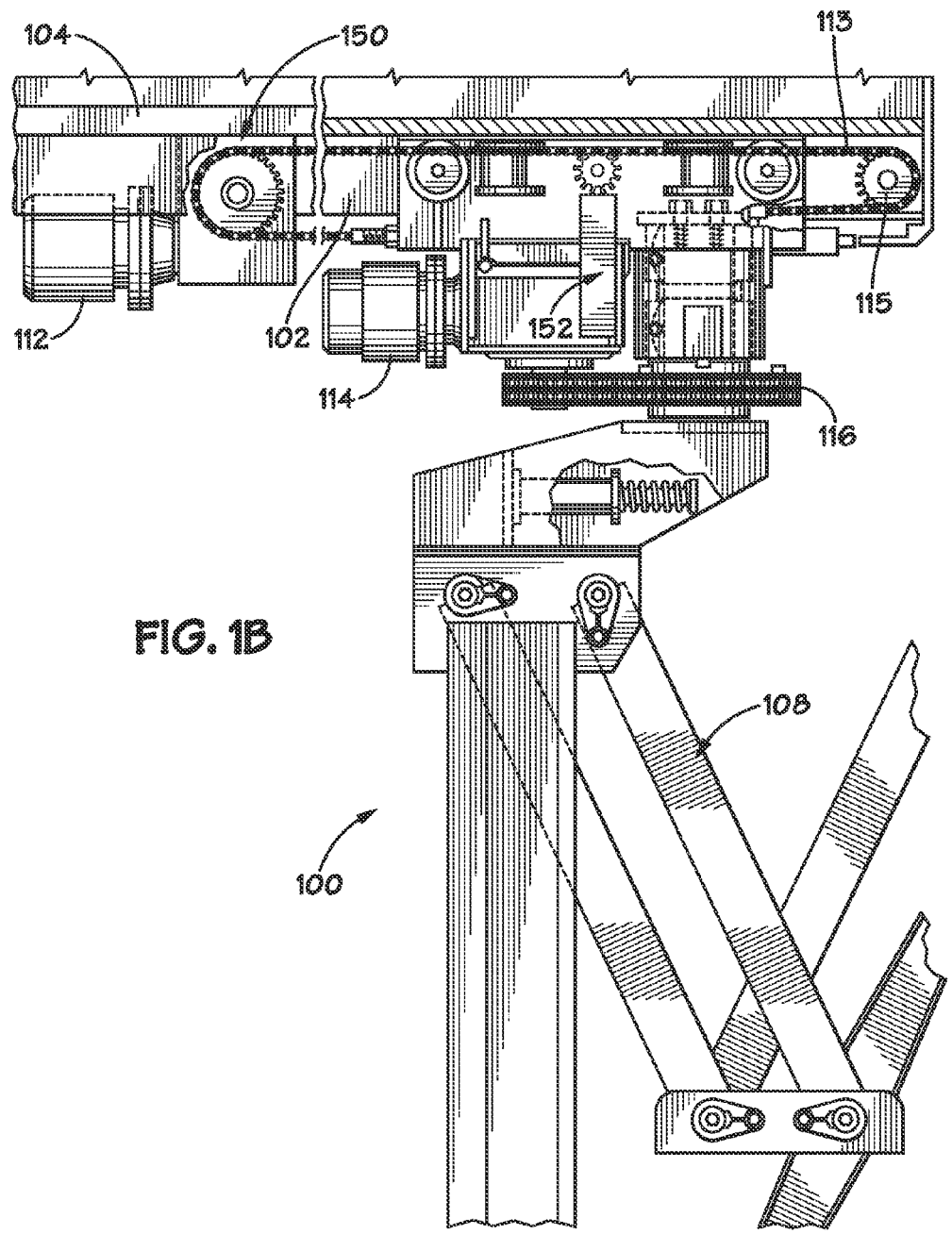
FIG. 1B is an enlarged view of part of the system of FIG. 1A.

FIGS. 1A and 1B illustrate an illustrative pipe racker system 100 that includes a carriage 102 that is movable on a base 104. A pipe gripper system 106 is movable by use of a movement system 108 to grip a pipe, e.g., pipe 110, used in wellbore operations. A motor 112 and a power transfer member 113 (e.g., a chain or belt) is used to drive a member 115 (e.g., a driven pulley) of a drive apparatus which moves the carriage 102 relative to the base 104. The motor 112 has a tensioning system 150 (shown schematically) according to the present disclosure for setting initial desired tension on the power transfer member 113, for accommodating undesirable changes in tension during operation (e.g., due to vibration or material elongation), and to maintain a desired constant or nearly constant tension on the power transfer member 113. A second motor 114 has a tensioning system 152 (shown schematically) according to the present disclosure for tensioning a second power transfer member 116 that is employed when moving the movement system 108. The second motor 114 is operatively arranged to drive a second power transfer member 116.

Figure 2A:
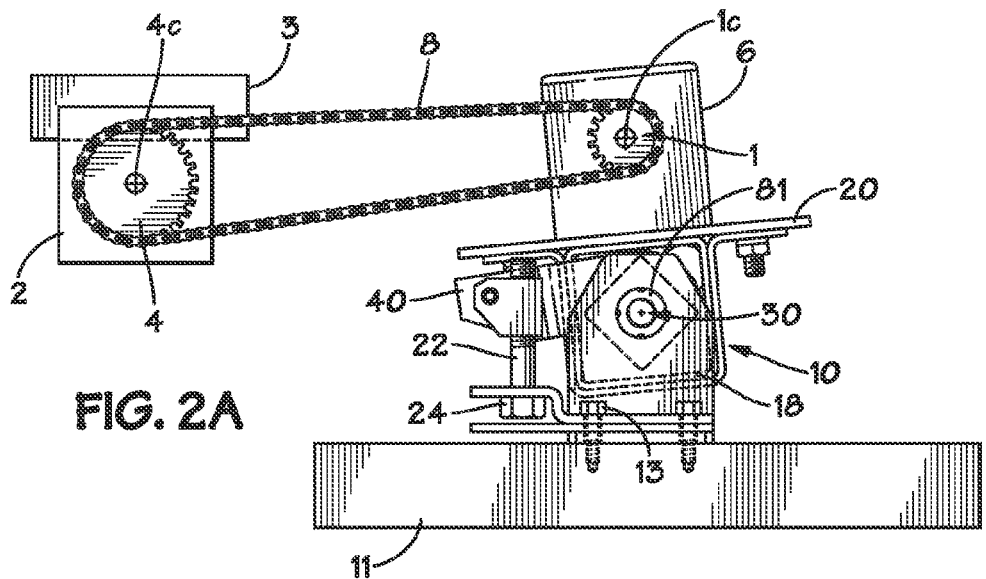
FIGS. 2A-2B are side views of one illustrative embodiment of a tensioner system disclosed herein.
Figure 2B:
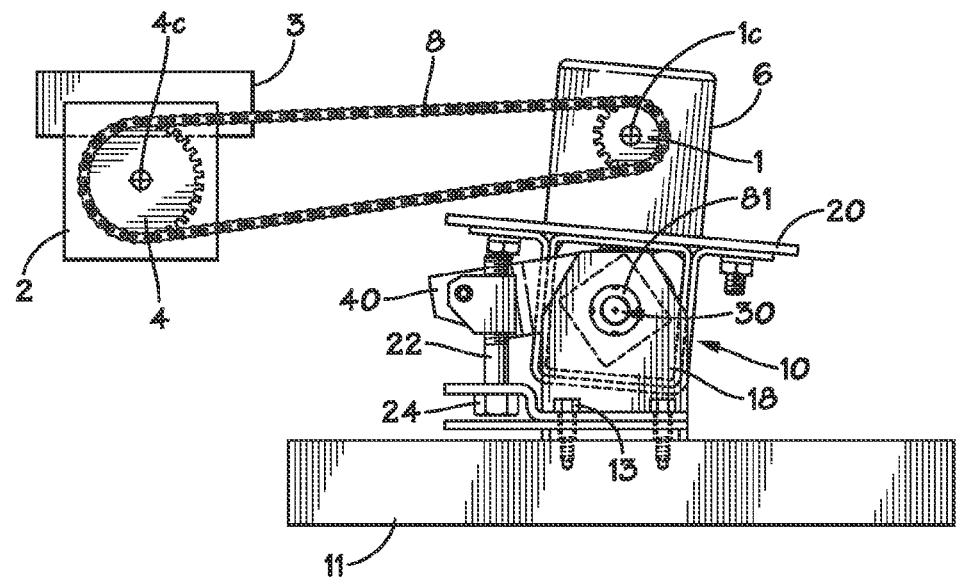

FIGS. 2A and 2B illustrate one illustrative embodiment of a tensioner system 10 according to the present disclosure for tensioning a power transfer member 8, such as a chain or belt. As depicted herein, the power transfer member 8 is operatively coupled to a motor 6 which transfers power from a drive member 1 (e.g., a drive pulley) of the motor 6 to a driven member 4 (e.g., a driven pulley) of a device 2. The drive member 1 has a center of rotation 1c, and the driven member 4 has a center of rotation 4c. The device 2 is intended to be generic and schematic in nature as the tensioner 10 disclosed herein may be employed with any type of device where a motor-driven power transfer member 8 is employed to perform useful work. For example, in one illustrative embodiment, the device 2 may be a driving apparatus which moves a schematically depicted structure 3, such as the illustrative carriage 102 of the illustrative pipe racker system 100 shown in FIGS. 1A-1B. In other embodiments, the device 2 may take other forms, such as a conveyor belt, etc. In one illustrative embodiment, the motor 6 may be removably coupled to an illustrative base 20 with one or more fasteners (not shown). In one illustrative embodiment, the motor 6 may be an electrical motor, a hydraulic motor, a pneumatic motor or an internal combustion engine. The tensioner system 10 is secured with illustrative bolts 13 to a support 11, which may be any suitable part of a system that includes the tensioner 10.

In general, rotation of the base 20, and thus the motor 6, is the means by which the tension of the power transfer member 8, e.g., a belt or a chain, may be adjusted. More specifically, rotation of the base 20 causes the position of the motor 6 to change, thereby providing a means for adjusting the tension of the power transfer member 8. For example, FIG. 2A depicts an illustrative embodiment of the tensioner 10 wherein the base 20 is adapted to rotate about a main shaft 30 of the tensioner 10. In FIG. 2A, the base 20 is tilted toward the device 2. In FIG. 2B, the base 20 is now tilted away from the device 2, thereby increasing the distance between the center of rotation (1c) of the drive member 1 and the center of rotation (4c) of the driven member 4. The rotation depicted in FIG. 2A increases the tension on the power transfer member 8, relative to the tension on the power transfer member 8 in the position indicated in FIG. 2A. The means for adjusting the tension on the power transfer member 8 may be employed to adjust the tension when the device 2 and/or motor 6 are at rest and, importantly, when the device 2 and motor 6 are operating under load conditions.

Figure 5:
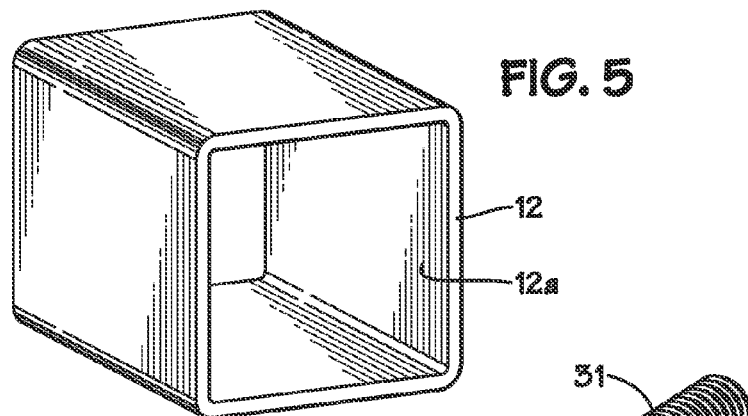
FIG. 5 is a perspective view of an illustrative housing of the illustrative tensioner system of FIG. 2A.

As shown in FIGS. 3A-3F, in one illustrative embodiment, the tensioner system 10 has an illustrative housing 12 that is connected to a base 20 with brackets 14 and bolts 16, washers 15, and nuts 17. The mounts 18 may be connected to the support 11 (see FIG. 2A) with illustrative bolts 13. The base 20 provides support for the motor 6. In one illustrative embodiment, the head 24 of the bolt 22 (see FIGS. 3B, 3D) is releasably positioned in a notch 28 of a plate 32. The head 24 of the bolt 22 is positioned below the plate 32 and above a plate 34. Illustrative bolts 13 (see FIGS. 2A-2B) secure the plates 32 and 34 to a mount 18. A perspective view of one illustrative embodiment of the housing 12, having an interior surface 12a, is depicted in FIG. 5. In this illustrative embodiment, the housing 12 may be comprised of structural tubing having a generally square or rectangular configuration.

Figure 20:
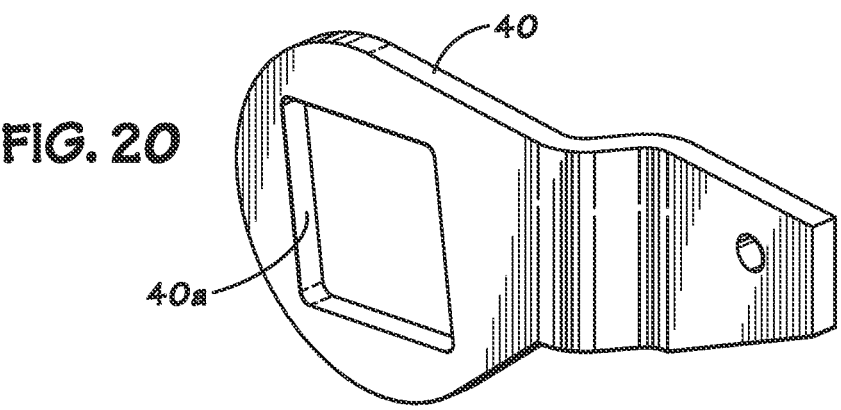
FIG. 20 is a perspective view of one illustrative embodiment of an lever arm for the illustrative tensioner system of FIG. 2A.

A split threaded nut 36 (see, e.g., FIGS. 3D and 11) is adapted to threadingly engage the threaded bolt 22. As will be described more fully below, the bolt 22 may be rotated with a wrench to cause rotation of the base 20 about the axis 30a of the main shaft 30. Of course, this adjustment process may be automated if desire by, for example, employing a motor driven device or linkage for rotating the bolt 22. Once the base 20 is rotated to the desired position, the split nut 36 may be tightened to secure the bolt 24 in the desired position. The split nut 36 is coupled to an illustrative lever arm 40 with a bolt 38, washer 37 and nut 39. A perspective view of one illustrative embodiment of the lever arm 40 is shown in FIG. 20. As indicated therein, the lever arm 40 has a generally square opening 40a. The top 25 of the bolt 22 is positioned beneath an underside 20U of the base 20. The position of the top 25 of the bolt 22 may be adjusted by rotating the head 24 of the bolt 22. By virtue of the interaction with the split nut 36, rotation of the bolt 22 exerts a force on the lever arm 40, which, in turn, causes the main shaft 30 (see FIG. 3A) and the base 20 to rotate about the centerline 30a of the main shaft 30. Of course, as will be recognized by those skilled in the art after a complete reading of the present application, the combination of the threaded bolt 22 and the split nut 36 is but one example of a device or mechanism that may be used to generate a force on the illustrative lever arm 40. For example, other devices, such as a single or double acting hydraulic or pneumatic cylinder, a cam, etc., could be employed in lieu of the illustrative threaded bolt 22/split nut 36 combination depicted herein to exert the desired force on the lever arm 40.

Figure 4A:
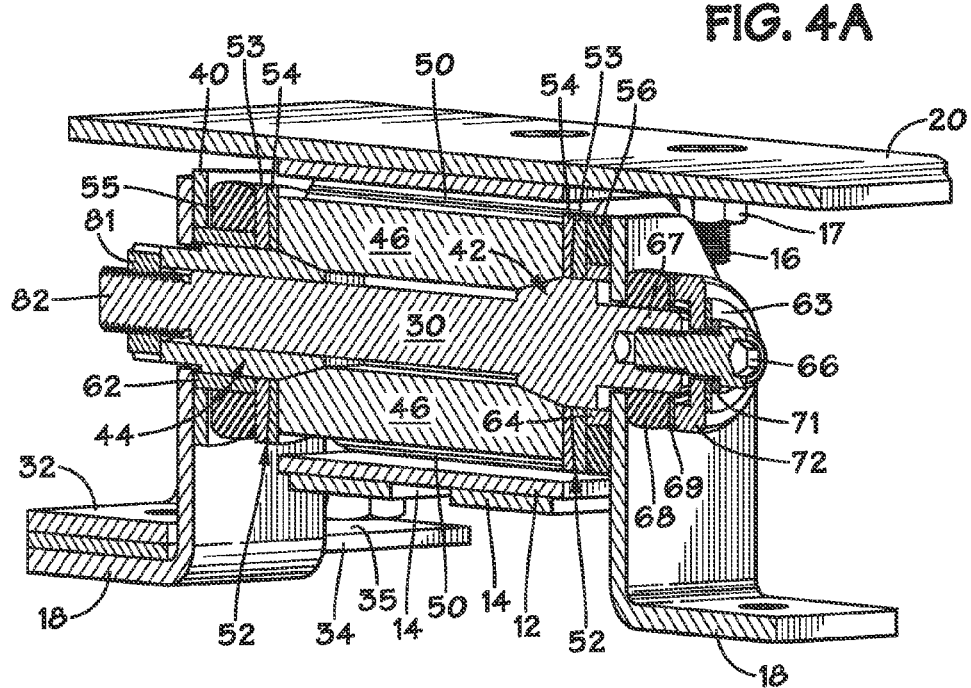
FIG. 4A is a perspective partially cut away view of the illustrative tensioner system of FIG. 2A.
Figure 4B:
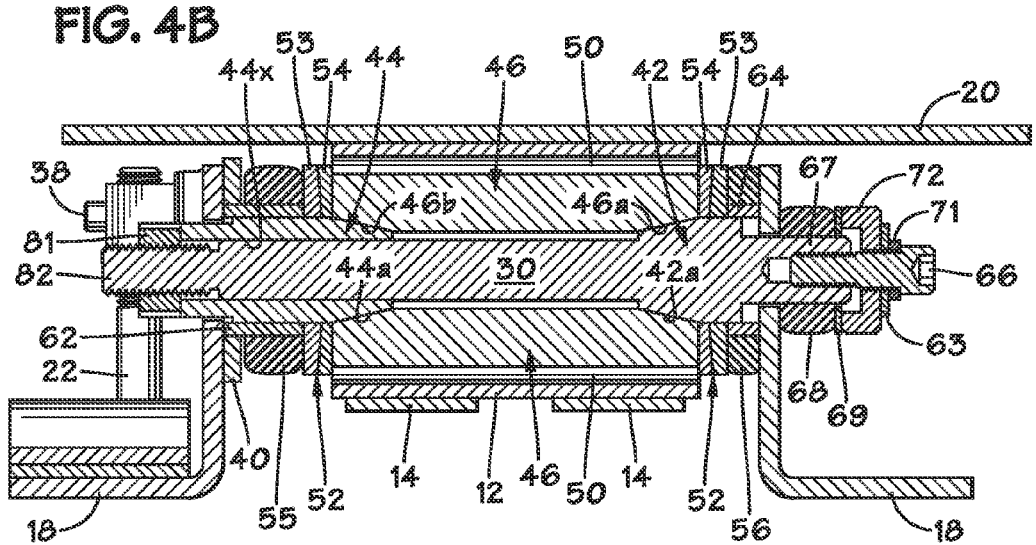
FIG. 4B is a side cross-sectional view of the illustrative tensioner system in FIG. 4A.
Figure 6A:
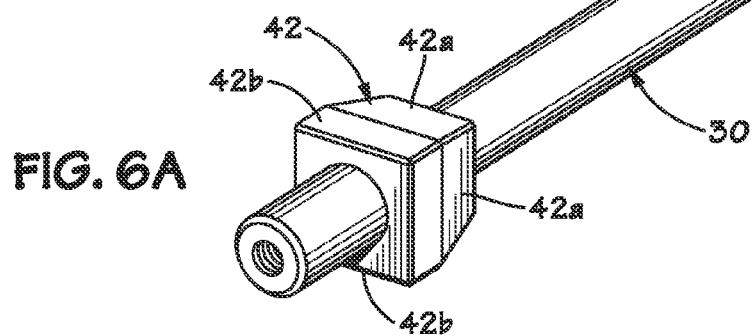
FIG. 6A is a perspective view of an illustrative main shaft with an illustrative fixed wedge as disclosed herein for the illustrative tensioner system of FIG. 2A.
Figure 6B:
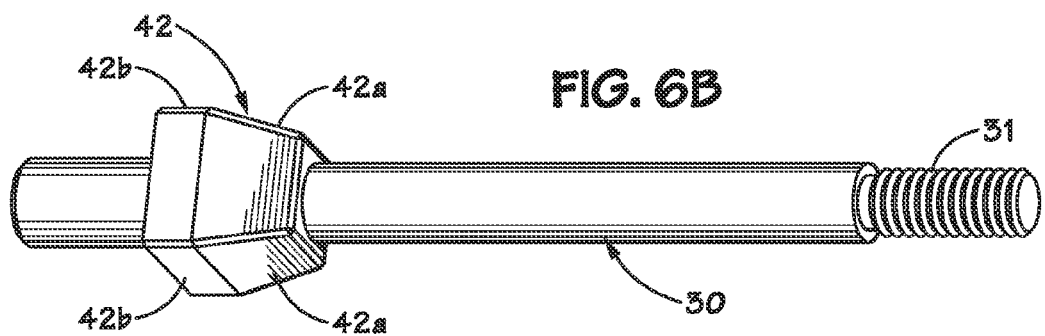
FIG. 6B is a side view of the illustrative main shaft and fixed wedge shown in FIG. 6A.
Figure 7:
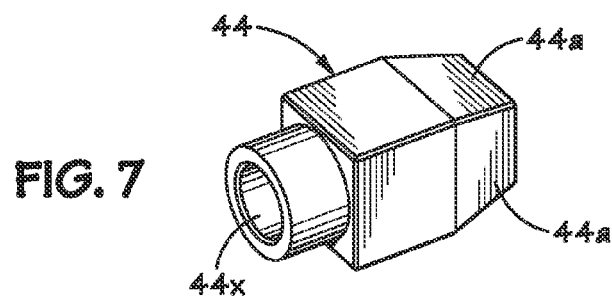
FIG. 7 is a perspective view of an illustrative movable wedge disclosed herein for the illustrative tensioner system of FIG. 2A.

With reference to FIGS. 4A-4B, in one illustrative embodiment, the tensioner 10 includes the main shaft 30, supported by the mounts 18, a fixed wedge 42 and a movable wedge 44. Various views of illustrative embodiments of the fixed wedge 42 are shown in FIGS. 6A-6B. A perspective view of one illustrative embodiment of the movable wedge 44 is depicted in FIG. 7. The main shaft 30 passes through the opening 44x in the movable wedge 44. FIGS. 6A-6B are various views of one illustrative embodiment of the main shaft 30 having the fixed wedge 42 formed on or fixedly coupled to the main shaft 30. The fixed wedge 42 includes a plurality of tapered surfaces 42a and a plurality of generally flat surfaces 42b. In the illustrative embodiment depicted herein, the generally square opening 40a of the lever arm 40 is adapted to be positioned around the square tube 62 when the tensioner 10 is assembled. Continuing to refer to FIGS. 4A-4B, adjusting the position of a nut 81 on the main shaft 30 adjusts the position of the movable wedge 44 along the longitudinal axis of the main shaft 30. The movement of the movable wedge 44 adjusts the position of movable deforming members 46 (which are in contact with both wedges 42 and 44) radially outward with respect to the centerline of the main shaft 30. The movable deforming members 46 contact (and, in some cases, deform) the deformable elastic elements 50 positioned within the housing 12. If the nut 81 is in its most retracted position, the moveable wedge 44 may permit the moveable deforming members 46 to effectively move radially inward in response to forces generated by compressed deformable elastic elements 50.

Still referring to FIGS. 4A-4B and FIGS. 12-14, in one illustrative embodiment, spherical washer pairs 52, each with a spherical washer 53 and a spherical washer 54, maintain the position of the members 46 longitudinally with respect to the main shaft 30. In one illustrative embodiment, compression member 55 abuts the spherical washer 53 and another similar compression member 56 abuts a spherical washer 53. The compression members 55, 56 can contract and expand. Illustrative embodiments of the compression members 55, 56 are also depicted in FIGS. 15A-15B. Among other things, the compression members 55, 56 compensate for manufacturing tolerances of the various parts of the tensioner 10 and help adjustably maintain the various parts of the tensioner 10 in proper position. In one illustrative embodiment, a square tube 62 (see FIG. 16) abuts the spherical washer 53 at the end of the shaft 30 proximate the movable wedge 44, and a square tube 64 (see FIG. 16) abuts the spherical washer 53 at the end of the shaft 30 proximate the fixed wedge 42. These square tubes 62, 64 push the spherical washers 53, 54 together, thereby helping to maintain the position of the lever arm 40 and limit compression of the members 55, 56.

Figure 17:
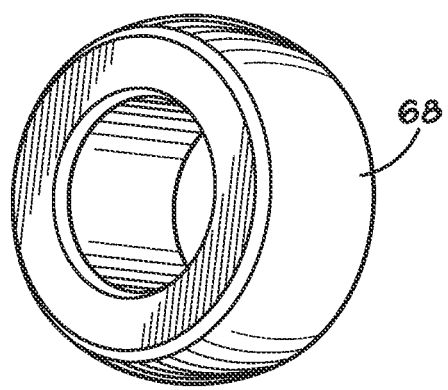
FIG. 17 is a perspective view of one illustrative embodiment of an elastic bushing for the illustrative tensioner system of FIG. 2A.
Figure 18:
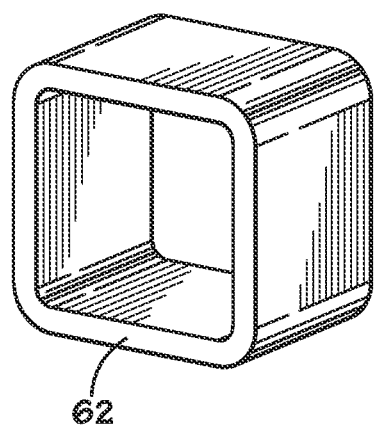
FIG. 18 is a perspective view of one illustrative embodiment of a support bushing for the illustrative tensioner system of FIG. 2A.
Figure 19:
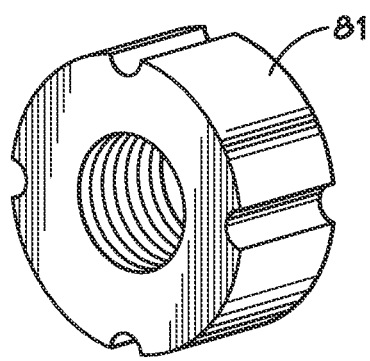
FIG. 19 is a perspective view of one illustrative embodiment of a tensioning nut for the illustrative tensioner system of FIG. 2A.

In one illustrative embodiment, a bolt 66, in combination with other parts, secures one end 67 of the main shaft 30 to a mount 18. An elastic bushing 68 surrounds the end 67. See FIG. 17. A protector 72 (see also FIG. 10) on one side abuts a washer 69 and on the other side a washer 63. A spring washer 71 is used between the bolt 66 and the washer 63. On the other end of the shaft 30, the nut 81 threadedly mates with an end 82 of the main shaft 30. A perspective view of one illustrative embodiment of the nut 81 is depicted in FIG. 19. The nut 81 may be used to adjust the position of the movable wedge 44 axially along the main shaft 30.

As shown, for example, in FIGS. 6A-6B, the fixed wedge 42 has a plurality of wedge surfaces 42a which are tapered to correspond to a corresponding tapered surface 46a of the movable deforming members 46 (see, e.g., FIGS. 4B and 9A). The movable wedge 44 as shown, e.g., in FIG. 7, has a plurality of wedge surfaces 44a which are tapered to correspond to corresponding tapered surfaces 46b of the movable members 46 (see, e.g., FIGS. 4B and 9A). Moving the movable wedge 44 inward along the longitudinal axis of the main shaft 30 moves the movable deforming members 46 radially outward relative to the axis of the main shaft 30. This outward movement of the movable deforming members 46 causes the moveable deforming members 46 to engage and/or deform the deformable elastic elements 50 within the housing 12. It should be noted that, in one illustrative embodiment, the deformable elastic elements 50 are cylindrical in configuration in their relaxed condition. Alternatively, the deformable elastic members 50 may formed, fully or partially, such that they have a configuration that is adapted to be positioned within the housing 12 between the housing 12 and the moveable deforming members 46. Of course, in this latter example, at least a portion of the deformable elastic members 50 is resilient and deformable in order to achieve the performance described herein.

Figure 3A:
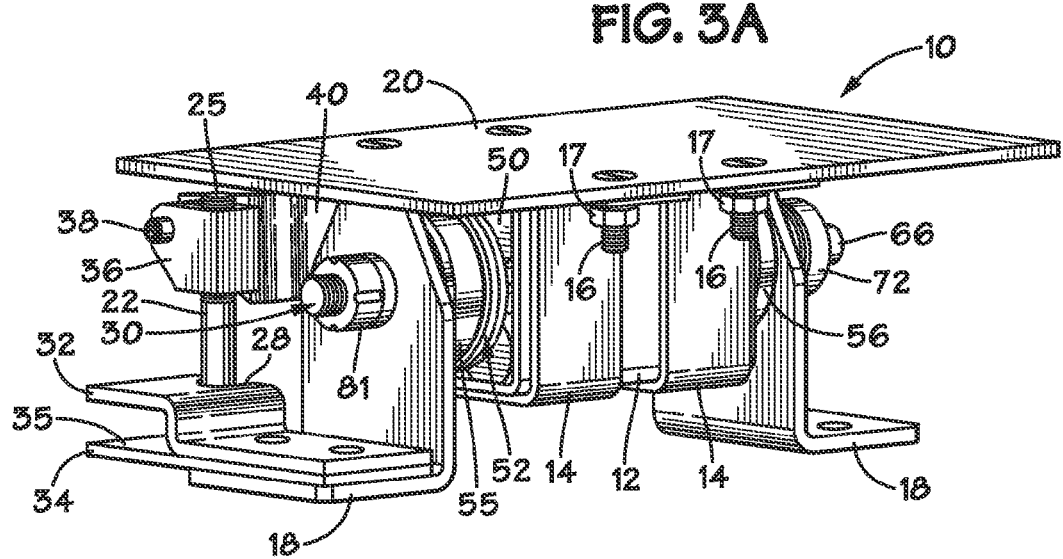
FIG. 3A is a perspective view of the illustrative tensioner system of FIG. 2A.
Figure 3B:
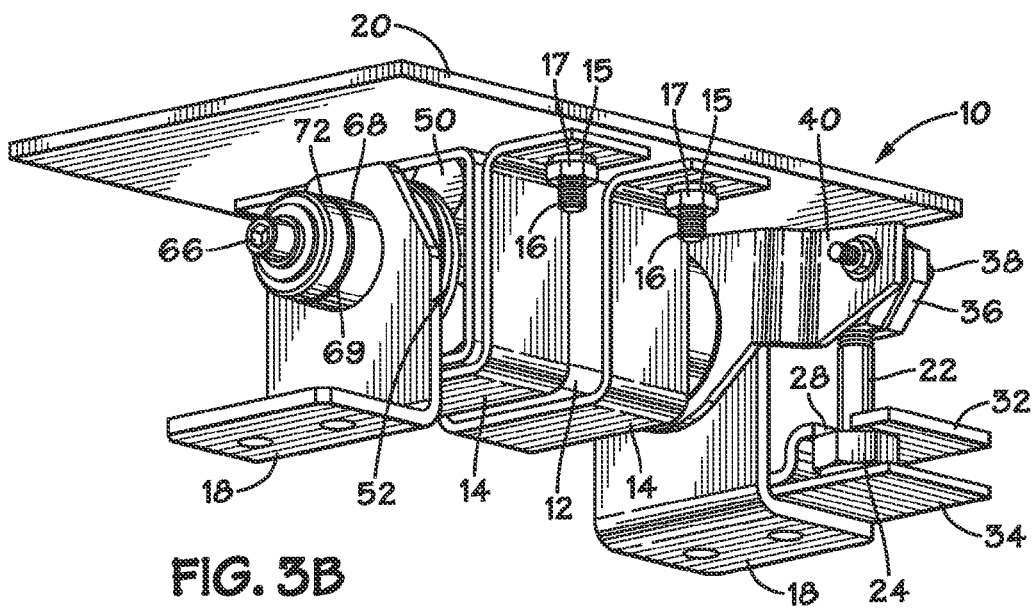
FIG. 3B is a bottom perspective view of the illustrative tensioner system of FIG. 2A.
Figure 3C:
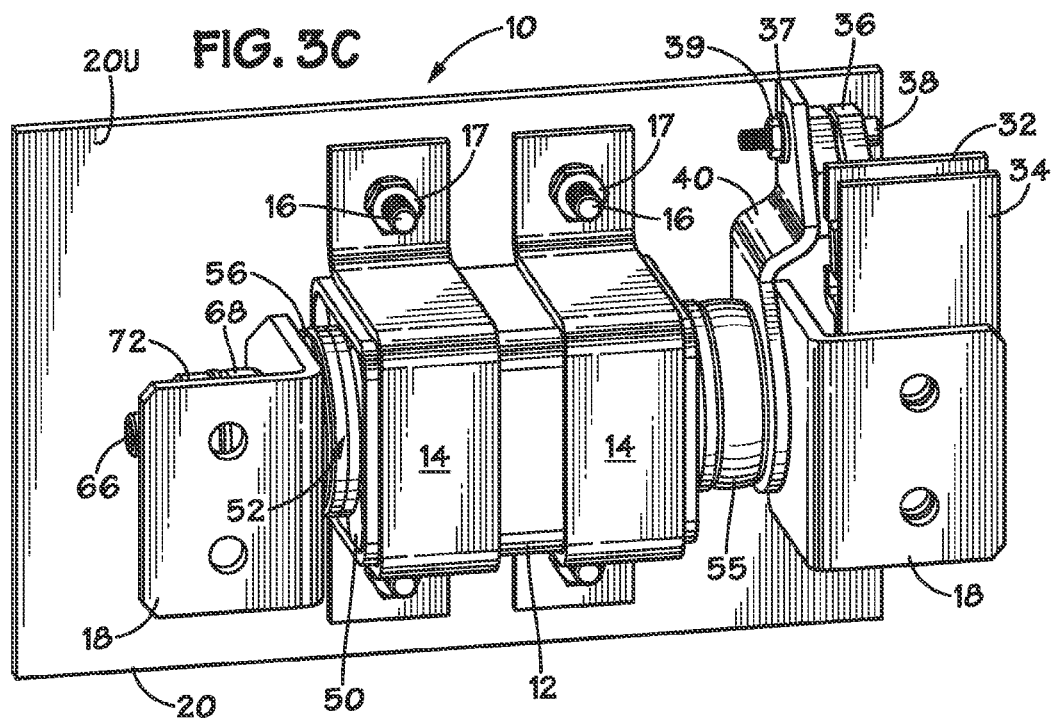
FIG. 3C is a bottom view of the illustrative tensioner system of FIG. 2A.
Figure 3D:
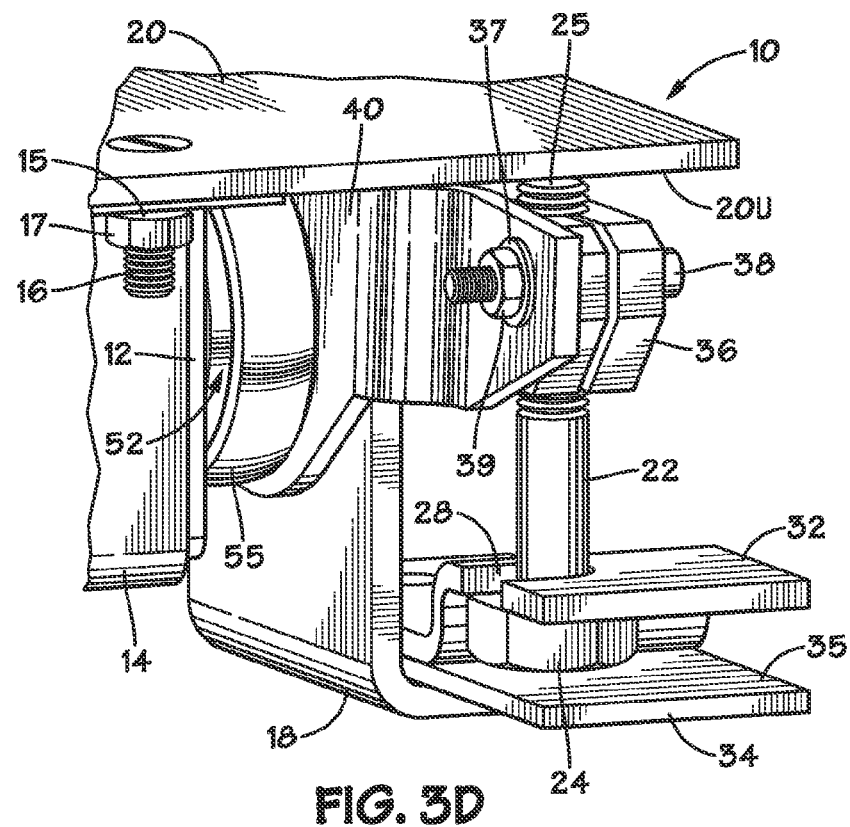
FIG. 3D is an enlarged view of part of the illustrative tensioner system as shown in FIG. 3B.
Figure 3E:
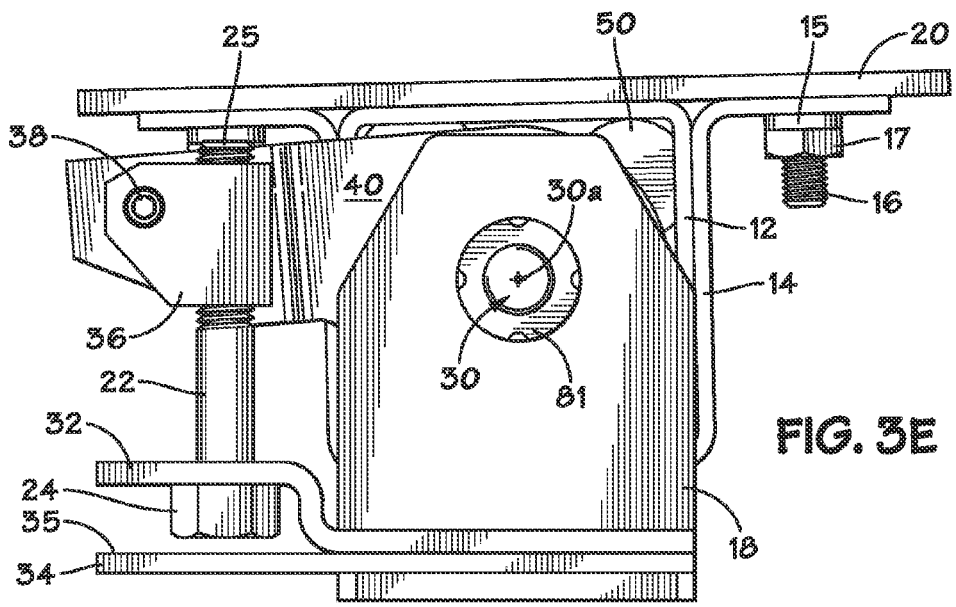
FIG. 3E is an end view of the illustrative tensioner system of FIG. 2A.
Figure 3F:
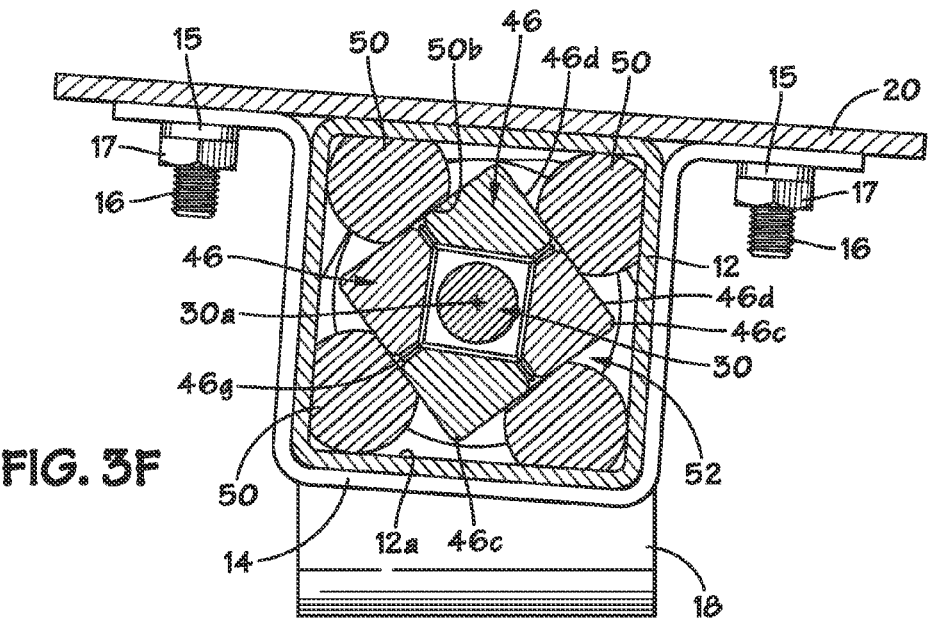
FIG. 3F is a cross-sectional view of part of the interior of the illustrative tensioner system of FIG. 2A.

The moveable wedge 44 and the deformable elastic elements 50 may be employed to adjust or set a range for the amount of tension that may be applied to the power transfer member 8 during tensioning operation. That is, as a result of the elasticity of the deformable elastic elements 50, and the compression thereof (in some cases), the range of tension allowed on the power transfer member 8 (e.g., a chain or belt) is automatically kept within a desired range and the desired tension on the member 8 is substantially maintained. As shown in FIG. 3F, there is a gap 46g (which can receive elastic material that forms the deformable elastic element 50) between the movable members 46 when they are spread apart by the movement of the movable wedge 44. Initial tensioning of the power transfer member 8 is accomplished by the initial position of the threaded bolt 22.

With reference to FIGS. 3F and 8, in one illustrative embodiment, the deformable elastic elements 50 which, initially, in one illustrative embodiment, are generally cylindrical. FIG. 8 depicts the illustrative deformable elastic elements 50 in a compressed form. As shown in FIG. 3F, the deformable elastic elements 50 have been compressed or deformed by the radially outward movement of the movable deforming members 46, which was caused by rotation of the nut 81 on the main shaft 30 which, in turn, resulted in movement of the movable wedge 44 toward the fixed wedge 42. The deformable elastic elements 50 and the movable deforming members 46 effectively stiffen the tensioner 10 while, due to the elastic nature of the deformable elastic elements 50, permit some movement of the base 20 and thereby maintain constant (or nearly constant) tension on the member 8 during operations.

With reference to FIGS. 3F and 9A-9B, in one illustrative embodiment, the movable deforming members 46 for the tensioner 10 include four spaced-apart deforming members 46 positioned within the housing 12. In one illustrative embodiment, the deformable elastic elements 50 are four spaced-apart deformable members 50 positioned between an interior surface 12a of the housing 12 and exterior surfaces of the movable deforming members 46. Of course, as will be recognized by those skilled in the art after a complete reading of the present application, the size, number, shape and configuration of the illustrative moveable deforming members 46 may vary depending on the application. For example, in some applications, only two of the moveable deforming members 46 may be employed, perhaps in conjunction with a reduction in the number or a change in shape of the deformable elastic members 50. Thus the illustrative number and configuration of the illustrative moveable deforming members 46 and the deformable elastic members 50 depicted herein should not be considered a limitation of the present invention. In one illustrative embodiment, each movable deforming member 46 has an apex 46c defined by two side surfaces 46d, wherein each apex 46c is located between two of the deformable elastic elements 50. In some cases, the moveable deforming members 46 and the deformable elastic elements 50 are sized and configured such that portions of the moveable deforming members 46, such as the illustrative apex 46c, do not contact a deformable elastic element 50. Each side surface 46d of a movable deforming member 46 abuts part of a deformable elastic element 50. One illustrative embodiment of the deformable elastic elements 50 are depicted in FIG. 8 in an illustrative deformed condition. As shown therein, the deformable elastic element 50 has a flat base 50b, part of which is in contact with a side surface 46d of two adjacent movable deforming members 46. See also FIG. 3F. The deformable elastic elements 50 can accommodate movement (vibration) of the motor 6 to substantially maintain the desired tension on the power transfer member 8. In one illustrative embodiment, the movable deforming members 46 are initially positioned to provide a desired range of force to be accommodated by the movable deforming members 46 and a corresponding tensioning force range for the power transfer member 8.

As shown, e.g., in FIGS. 12-14, the spherical washers 53 have a concave face 53a and the spherical washers 54 have a convex face 54a corresponding to the concave face 53a. Since the spherical washers can move slightly with respect to each other (concave surface moving on a convex surface), they accommodate tilting of the base 20 and can, therefore, accommodate some misalignment of the main shaft 30 with respect to the mounts 18. Optionally, the spherical washers 53, 54 may be deleted and regular flat washers may be used. Using such a system according to the present disclosure decreases the amplitude of vibration of a power transfer member 8 (e.g., belt, chain drive) so that forces therein are more constant.

As to materials of construction, the various structural components of the tensioner 10, e.g., base 20, shaft 30, bolt 22, supports 18, the wedges 42, 44, the movable deforming members 46, etc., may be made of any structurally sound material, such as, for example, steel, aluminum, etc. The various compression members 55, 56 and the deformable elastic members 50 may be made of rubber compounds of any kind, and in one particular embodiment, of materials that are oil resistant and temperature resistant.

One illustrative technique for adjusting the tension on the power transfer member 8 will now be described. Initially, the moveable wedge 44 may be urged inward of the housing 14 in a direction substantially parallel to the longitudinal axis of the main shaft 30. In the depicted example, this may be accomplished by rotating the nut 81 relative to the shaft 30 to thereby urge the moveable wedge(s) 44 inward. As indicated earlier, this action sets the allowable range of tension that may be applied to the power transfer member 8. After movement of the moveable wedge(s) 44, a force may be applied to the lever arm 40 using the bolt 22/threaded nut 36 combination to thereby apply the desired tension to the power transfer member 8, the applied tension being within the allowable range of tension set by inward movement of the moveable wedge(s) 44. One the desired tension is applied the power transfer member 8, the system may be locked in place by tightening the bolt-nut combination 38, 39 to tighten the split nut 36 around the bolt 22. As will be noted, by virtue of the threaded relation between the nut 81 and the shaft 30, the range of allowable tension to be applied to the power transfer member 8 may be set to effectively any desired range as contrasted with prior art devices where the variability of such ranges was limited.

The present invention, therefore, provides in some, but not in necessarily all embodiments a tensioner system 10 for tensioning a power transfer member 8 used to transfer power from a motor 6 to apparatus 2 driven by the motor (e.g., but not limited to, a motor used in a derrick pipe handler). In one illustrative embodiment, the tensioner system 10 includes a base 20, the motor 6 being mounted on the base 20, a housing 12 connected to the base 20, a main shaft 30 passing through the housing 12, mounting structures 18 supporting the main shaft 30, deformable elastic members 50 positioned within the housing 12, and removing deforming member 46, wherein deformable elastic members 50 are deformed in response to movement of the movable deforming members 46 so that the desired stiffness of the tension system is set or adjusted such that the tension on the power transfer member 8 is substantially maintained.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A tensioner system for tensioning a power transfer member used to transfer power from a motor to apparatus driven by the motor, the tensioner system comprising:
    a base adapted to rotate about a main shaft, wherein the base is adapted to be operatively coupled to the motor;
    a housing positioned around said main shaft;
    a plurality of deformable elastic members positioned within the housing; and
    a plurality of deforming members positioned within said housing around said main shaft, said plurality of deforming members adapted to be urged in a radially outward direction so as to deform said deformable elastic members.

2. The tensioner system of claim 1, further comprising a fixed wedge positioned proximate a first end of said main shaft and a moveable wedge positioned proximate a second end of said main shaft, said moveable wedge adapted to engage said plurality of deforming members when said moveable wedge is moved in a direction that is inwardly of said housing and generally parallel to a longitudinal axis of said main shaft.

3. The tensioner system of claim 2, further comprising means for moving said moveable wedge in a direction that is inwardly of said housing and generally parallel to a longitudinal axis of said main shaft.

4. The tensioner system of claim 3, wherein said means for moving said moveable wedge comprises a threaded nut that is threadingly coupled to said main shaft.

5. The tensioner system of claim 2, wherein said plurality of deforming members are adapted to engage said fixed wedge.

6. The tensioner of claim 5, wherein said fixed wedge and said plurality of deforming members are adapted to engage one another along tapered surfaces.

7. The tensioner of claim 2, wherein said moveable wedge and said plurality of deforming members are adapted to engage one another along tapered surfaces.

8. The tensioner system of claim 1, wherein said plurality of deforming members comprises four spaced-apart deforming members positioned within the housing and the plurality of deformable elastic members comprises four spaced-apart deformable elastic members positioned within the housing between an interior surface of the housing and exterior surfaces of the plurality of deforming members.

9. The tensioner system of claim 8, wherein each of the plurality of deforming members has an apex defined by two side surfaces, each apex being positioned between two of the plurality of deformable elastic members without the apex contacting a deformable elastic member, and each side surface of a deforming member abutting at least a part of a deformable elastic member.

10. The tensioner system of claim 9, wherein each deformable elastic member is in contact with two adjacent deforming members.

11. The tensioner system of claim 1, further comprising a lever arm that is adapted to cause rotation of said base about said main shaft when a force is applied to said lever arm.

12. The tensioner system of claim 11, further comprising means for applying a force to said lever arm.

13. The tensioner system of claim 12, wherein said means for applying said force to said lever arm comprises a threaded bolt that is adapted to engage a split threaded nut.

14. A tensioner system for tensioning a power transfer member used to transfer power from a motor to apparatus driven by the motor, the tensioner system comprising:
    a base adapted to rotate about a main shaft, wherein the base is adapted to be operatively coupled to the motor;
    a housing positioned around said main shaft;
    a plurality of deformable elastic members positioned within the housing;
    a plurality of deforming members positioned within said housing around said main shaft, said plurality of deforming members adapted to be urged in a radially outward direction so as to deform said deformable elastic members;
    a fixed wedge positioned proximate a first end of said main shaft, wherein said fixed wedge and said plurality of deforming members are adapted to engage one another along tapered surfaces; and
    a moveable wedge positioned proximate a second end of said main shaft that is opposite said first end of said main shaft, wherein said moveable wedge and said plurality of deforming members are adapted to engage one another along tapered surfaces.

15. The tensioner system of claim 14, wherein said moveable wedge adapted to engage said plurality of deforming members when said moveable wedge is moved in a direction that is inwardly of said housing and generally parallel to a longitudinal axis of said main shaft.

16. The tensioner system of claim 15, further comprising means for moving said moveable wedge in a direction that is inwardly of said housing and generally parallel to a longitudinal axis of said main shaft.

17. The tensioner system of claim 15, further comprising a lever arm that is adapted to cause rotation of said base about said main shaft when a force is applied to said lever arm.

18. The tensioner system of claim 17, further comprising means for applying a force to said lever arm.

19. The tensioner system of claim 18, wherein said means for applying said force to said lever arm comprises a threaded bolt that is adapted to engage a split threaded nut.

* * * * *